United States Patent [19]

Elliott

[11] 4,034,848

[45] July 12, 1977

[54] APPARATUS FOR HANDLING MAGNETICALLY ATTRACTIVE MATERIAL

[76] Inventor: Eldon G. Elliott, 32458 Maryland, Livonia, Mich. 48150

[21] Appl. No.: 536,526

[22] Filed: Dec. 26, 1974

Related U.S. Application Data

[60] Continuation-in-part of Ser. No. 301,902, Oct. 30, 1972, abandoned, which is a division of Ser. No. 98,498, Dec. 16, 1970, Pat. No. 3,712,472.

[51] Int. Cl.$^2$ .......................................... B65G 17/46
[52] U.S. Cl. ................................. 198/570; 198/690
[58] Field of Search ............ 198/41, 218, 690, 570; 214/6 FS, 6 DS; 294/65.5; 104/154, 155, 156, 174

[56] References Cited

U.S. PATENT DOCUMENTS

| | | | |
|---|---|---|---|
| 1,719,231 | 7/1929 | McLaren | 104/156 |
| 2,622,745 | 12/1952 | Roe | 198/41 X |
| 2,759,606 | 8/1956 | Nippert | 198/41 X |
| 3,128,963 | 4/1964 | Erkes | 104/154 X |

Primary Examiner—Evon C. Blunk
Assistant Examiner—Douglas D. Watts
Attorney, Agent, or Firm—Reising, Ethington, Barnard, Perry & Brooks

[57] ABSTRACT

Apparatus for handling material by magnetic attraction comprising an elongated tubular member of nonmagnetic material with a magnet slidably received in the tubular member. The magnet is movable along the length of the tubular member between starting and dwell positions to carry magnetically attractive articles or material along the tubular member. A nonmagnetic barrier engages the tubular member between the starting and dwell positions to prevent the articles or material attracted by the magnets from moving past the position of the barrier as the magnet moves past the barrier to the dwell position.

19 Claims, 11 Drawing Figures

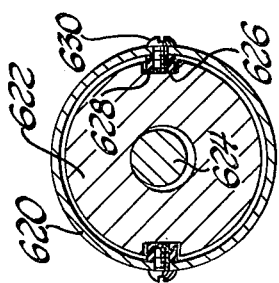
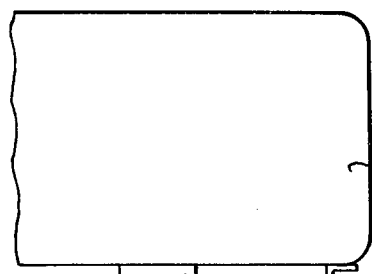
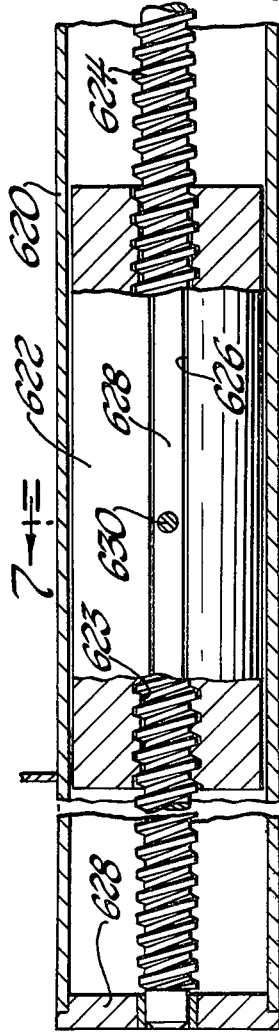
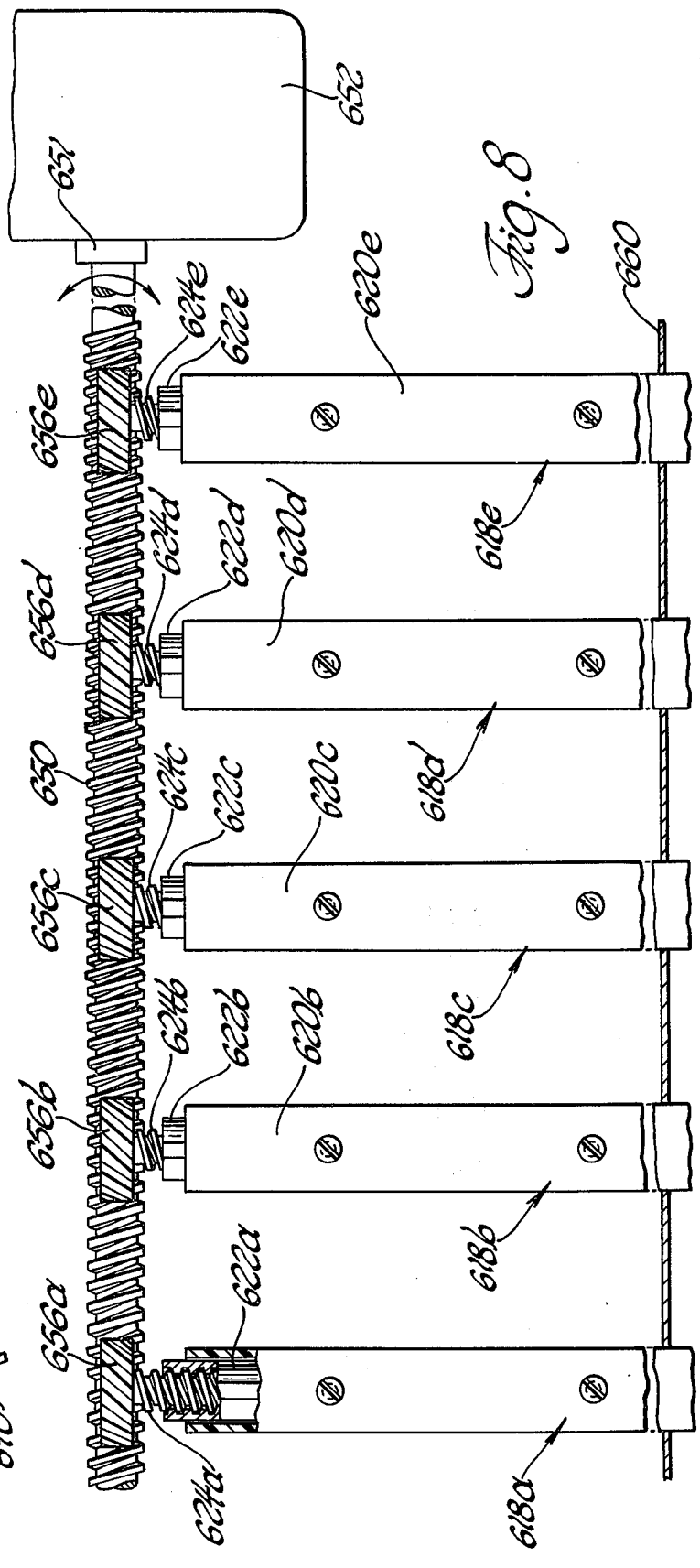

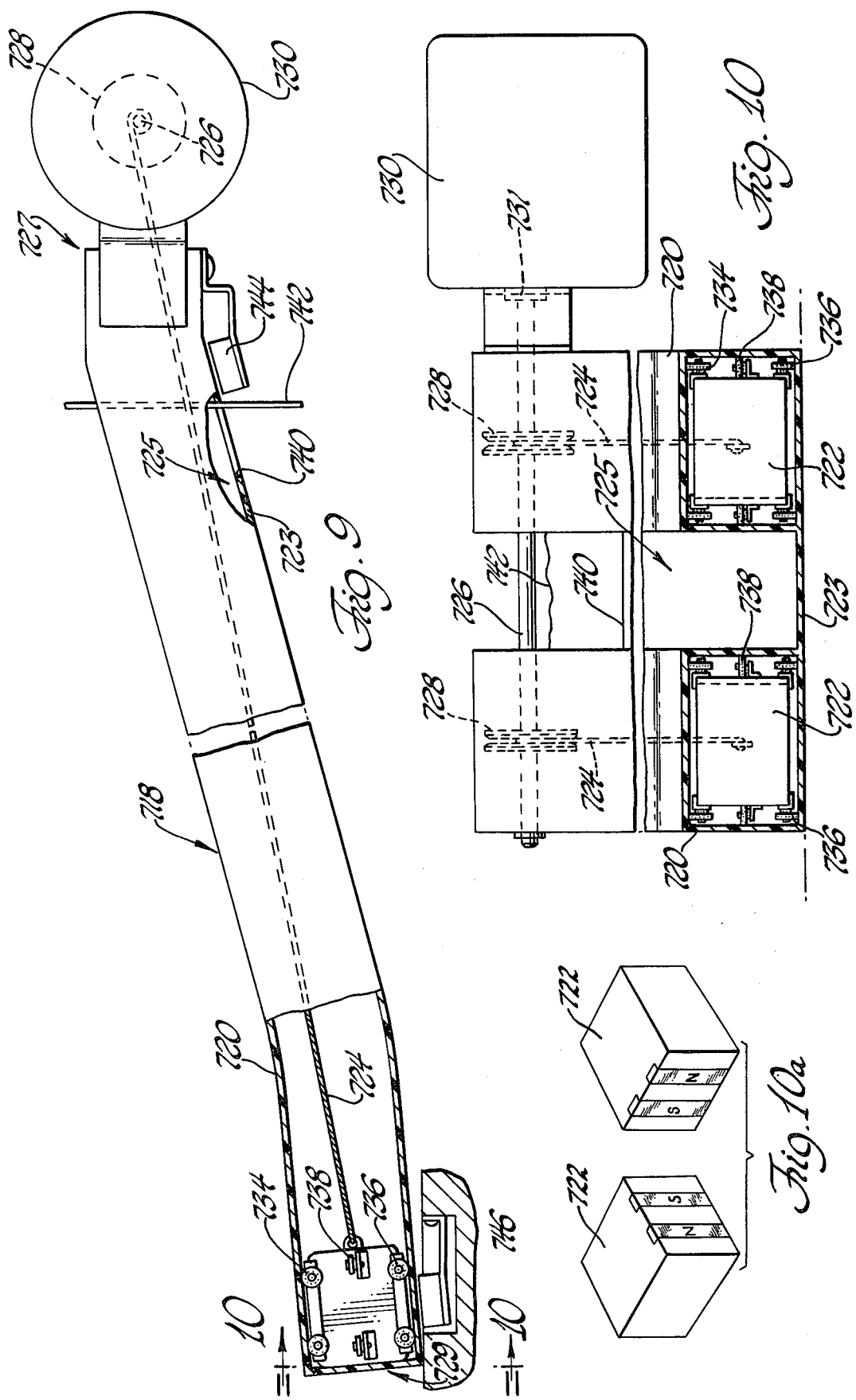

APPARATUS FOR HANDLING MAGNETICALLY ATTRACTIVE MATERIAL

This application is a continuation-in-part of copending application Ser. No. 301,902, filed Oct. 30, 1972, now abandoned, the latter application Ser. No. 301,902 being a division of application Ser. No. 98,498, filed Dec. 16, 1970, now U.S. Pat. No. 3,712,472.

This invention relates generally to material handling apparatus and is particularly concerned with apparatus for handling material by magnetic attraction.

There are many industrial processes wherein it is necessary to separate ferrous, or magnetically attractive material, from nonmagnetic material. Frequently, it is necessary to separate metal particles, chips and filings from a liquid slurry for the purpose of cleaning the liquid and also for recovering the metal particles. Existing apparatus for performing this function is expensive to operate, and requires high maintenance cost.

There are also many operations in industry requiring the frequent movement of material from one fixed location to another for further processing, storage, packaging or shipment. For example, in the handling of sheet material, it is frequently necessary to move the sheet material from one location to another location where it is stacked for storage or shipment. In some factories and manufacturing plants, it is necessary to move parts, scrap and other material over the same route between two locations.

An object of this invention is to provide apparatus for handling material by magnetic attraction wherein magnets are slidably received in nonmagnetic tubes so that movement of the magnets through the tubes can cause magnetically attractive material or carts or carriages to move along the length of the tubes.

Another object is to provide apparatus for handling material by magnetic attraction wherein all of the moving parts can be completely enclosed and protected from liquid, dust, and other deleterious substances.

Another object is to provide apparatus for handling material by magnetic attraction wherein a magnetic member is caused to move along a fixed path, the magnetic field of the magnetic member serving as the propelling force for moving the material to be handled, the magnet being enclosed by nonmagnetic material so that movement of the magnetic member beyond a barrier engaged by material attracted to the magnet will release the material from the field of the magnetic member.

In carrying out the foregoing, and other objects of the invention, apparatus according to the present invention includes an elongated tubular member of nonmagnetic material with a magnet slidably received in the tubular member for movement along the length thereof between a starting position near one end of the tubular member, and a dwell position near the other end thereof. The magnetic is operable to attract articles of magnetically responsive material externally of the tubular member when the magnet is caused to move between the starting and dwell positions. A barrier engages the tubular member between the starting and dwell positions for preventing articles and material moved along the tubular member by the magnet from moving past the position of the barrier as the magnet moves past the barrier to the dwell position.

In one arrangement, the magnet is in the form of a piston, having a generally fluid-tight relationship with the inner surface of the tubular member, and is caused to move through the tubular member by a fluid flow system. The fluid flow system is connected with the tubular member and is selectively operable to cause fluid flow in opposite directions through the tubular member, the fluid flow forcing the magnetic piston to move in the direction of flow through the tubular member. The fluid system includes a reservoir, a pump for delivering fluid from the reservoir and a valve for controlling the direction of flow of fluid from the pump through the tubular member.

One specific embodiment of the invention includes a container for a mixture of magnetically attractive material and nonmagnetic material; a pair of spaced parallel manifolds of nonmagnetic material with a plurality of spaced, parallel tubes of nonmagnetic material extending between the manifolds, each end of each tube being in fluid communication with one of the manifolds. A magneic piston is received in each of the tubes and a fluid flow system is connected with the manifold including a valve switch is selectively operable to cause fluid flow in opposite directions through the tubes to cause movement of the magnetic pistons in the same direction. One of the manifolds is supported in the container and the other manifold is located outside the container. A nonmagnetic barrier is mounted on the tubes outside the container for engaging magnetically attractive material carrier from the container by the magnetic attraction of the pistons as the pistons move from the manifold within the container toward the manifold that is located outside the container. As the pistons move past the barrier, the material carried from the container is released from the magnetic field.

When the tubes are located in a substantially vertical position with respect to the continer of magnetic and nonmagnetic material, one embodiment of the invention includes a shaft mounted on the tubes and extending transversely with respect to the tubes, and a plurality of rollers of magnetic material mounted on the shaft and spaced from each other such that each of the rollers is received between an adjacent pair of tubes of the shaft, the rollers being located outside the container near the barrier so as to collect by magnetic attraction material falling from the barrier. A chute having a slot for receiving each of the rollers with the edge of the slots being disposed in close, wiping contact with the rollers, wipes the material collected onto the magnetic rollers from the surfaces of the rollers as the rollers rotate through the slots, and the material wiped from the rollers is conducted by the chute to a container or remote location.

In another embodiment of the invention, the apparatus includes a plurality of spaced parallel tubes of nonmagnetic material with a magnetic slidably received in each of the tubes. A plurality of rollers, each of which is mounted between an adjacent pair of the tubes, is rotatable about an axis transverse to the tubes. The rollers are spaced from each other along the length of the tubes with the periphery of each roller projecting beyond the outer periphery of the tubes for supporting sheet material attracted by the magnets. As the magnets move through the tubes, the sheet material moves along the rollers until striking a nonmagnetic barrier. As the magnets move past the barrier, the sheet mateial is released from the magnetic field and drops from the tubes, the sheets being successively stacked beneath the tubes.

Another specific arrangement for moving material from one location to another includes tubes of nonmagnetic material with a magnet slidably received in each of the tubes and a material transporting carriage movably mounted on the tubes. The carriage has magnetic attractive elements for causing movement of the carriage in response to movement of the magnets in the tubes. As the magnets are forced to move through the tubes, the carriage is carried by the magnetic attraction along the length of the tube.

The invention may be embodied in an arrangement wherein a magnet is caused to be moved through a tubular member by mechanical motion transmitting means connected with the magnet, and operable to cause the magnet to move in opposite direction between starting and dwell positions. Power means is connected with the motion transmitting means for driving the motion transmitting means, the motion transmitting means extending from the power means through the tubular member into connection with the magnet such that the magnet and motion transmitting means are prevented by the tubular member from contacting material attracted by the magnet externally of the tubular member. the arrangement includes barrier means operable to interrupt movement of articles and materials attracted by the magnetic as the magnet travels toward the dwell position to cause such articles and materials to separate from the magnet as the magnet continues to move to the dwell position. In the disclosed embodiment, the barrier means is in the form of a shield of nonmagnetic material which engages the tubular member and is located between the starting and dwell positions in the path of movement of articles and material attracted by the magnet such that the shield engages and prevents the articles and materials from moving past the shield as the magnet moves to the dwell position. Consequently, the articles and material are released from the magnetic field when the magnet moves past the barrier to the dwell position.

In one embodiment according to the arrangement described in the preceding paragraph, the power means is in the form of a pair of rotatable shafts extending transversely of the tubular member and located at opposite ends thereof. The motion transmitting means comprises a pair of elongated flexible members, one of which is secured beween one of the shafts and the magnet and the other of which is secured between the other of the shafts and the magnet. Simultaneous rotation of the shafts in one direction causes one of the flexible members to wind around its shaft and the other flexible member to simultaneously unwind from its shaft, and the magnet is carried through the tubular member or members by the winding and unwinding of the respective flexible members. One of the shafts is powdered by a motor to rotate in one direction, and the other shaft is spring loaded to resist rotation in the direction of the power rotation of the shaft. Consequently, when the motor causes the shaft to rotate in one direction to move the magnet from the starting position to the dwell position, and is then turned off, the spring causes the magnet to return from the dwell position to the starting position.

In another embodiment, the tubular member has upper and lower ends, and a rotatable shaft extends transversely of the upper end of the tubular member. Motion transmitting means in the form of a cable or elongated flexible member extends from the shaft through the upper end to a magnet in the tubular member such that rotation of the shaft in one direction causes the magnet to move to the upper end and rotation of the shaft in the opposite direction permits the magnet to move by gravity to the lower end. A pair of such tubular members, of rectangular cross-section, can be arranged with a trough defined therebetween for moving material between the tubular members and the trough.

In another embodiment, an electric motor and a drum is provided at each end of a tubular member with a magentic slidably disposed in the tubular member. An elongated flexible member is wound around each drum with one end connected with one end of the magnet. Magnetically responsive reed switches are located near each end of the tubular member, the reed switches being connected in a control circuit for the motors. The motors are operated by the reed switches in accordance with the position of the magnet.

In still another embodiment of the invention, the magnet is propelled through the tube by a mechanical screw driven by a reversible electric motor. Reed switches may be positioned near opposite ends of the tubular member for operating the motor in accordance with the position of the magnet in the tube.

Other objects, advantages and features of the invention will become apparent from the following descriptions, taken in connection with the accompanying drawings in which:

FIG. 6 is a sectional view of apparatus embodying the invention wherein the magnet is operated by a mechanical screw;

FIG. 7 is a sectional view taken along lines 7—7 of FIG. 6;

FIG. 8 is a plan view of apparatus wherein a plurality of mechanical screw-driven magnets are employed in a plurality of spaced, parallel tubular members;

FIG. 9 is an elevational view, partially in section, of apparatus embodying the invention in still another form;

FIG. 10 is a sectional view taken on lines 10—10 of FIG. 9;

FIG. 10a is a perspective view of the magnets of the apparatus of FIG. 10 illustrating the orientation of the poles of the magnets.

Figure 1:
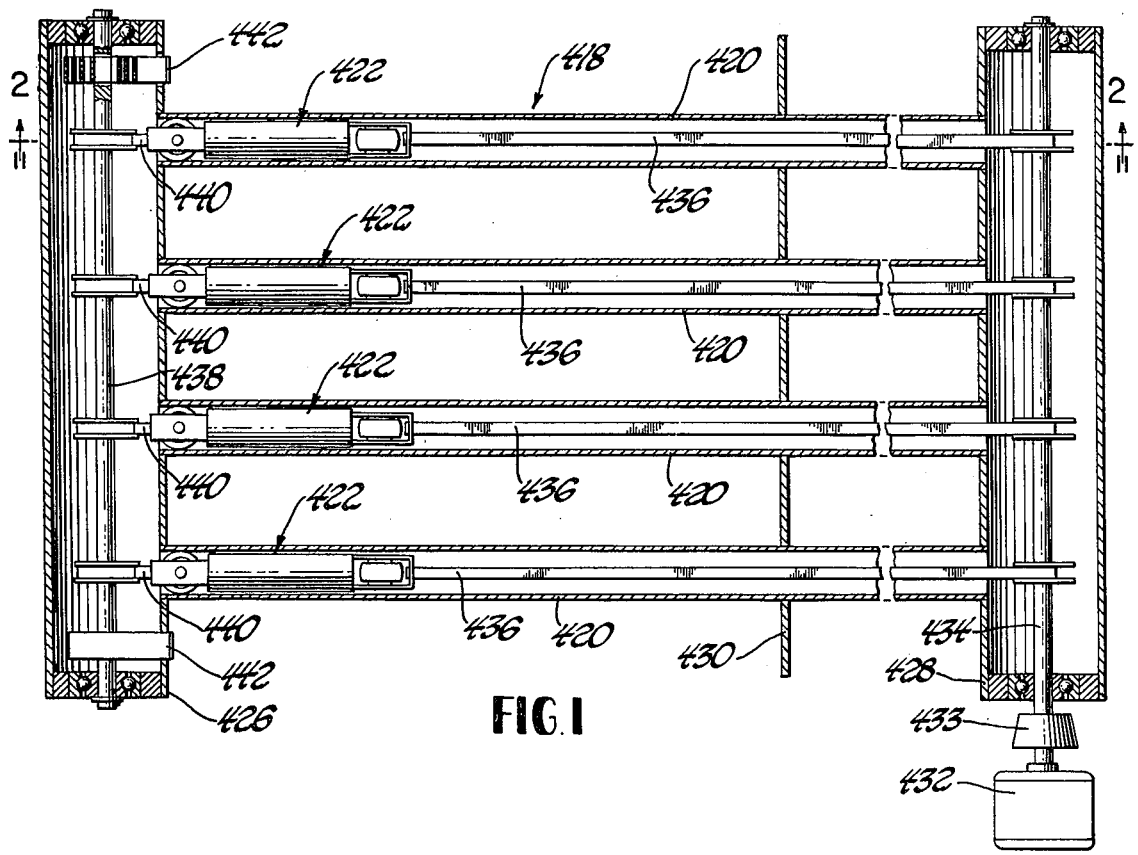
FIG. 1 is a sectional plan view of an arrangement for separating magnetically attractive particles by apparatus embodying the invention.
Figure 2:
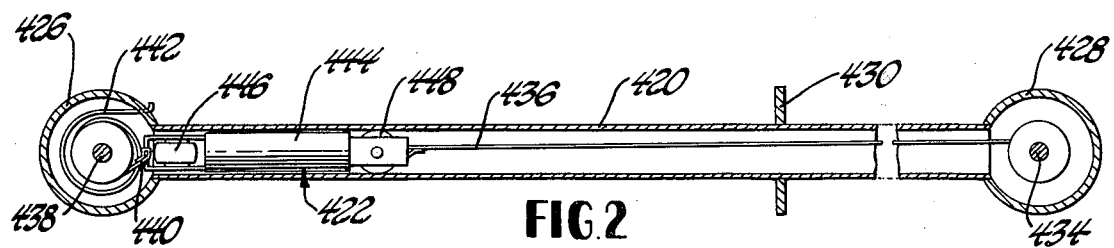
FIG. 2 is a sectional view taken on lines 2—2 of FIG. 1.

In FIGS. 1 and 2, reference numeral 418 collectively designates apparatus for handling material by magnetic attraction which apparatus comprises a plurality of spaced, parallel tubes 420 of nonmagnetic material; a magnet 422 supported in each of tubes 420 for reciprocable movement along the length thereof; and means for moving the magnets 422 simultaneously in a selected direction through the respective tubes.

The apparatus further includes transverse manifolds 426 and 428 at each end of the tubes 420, the manifolds securing the tubes 420 together in spaced, parallel relationship. The means for moving the magnets 422 simultaneously in a selected direction through the tubes 420 includes a pair of rotatable shafts 434 and 438 extending transversely of the tube 420; a first set of elongated flexible connectors 436, each of which has one end connected with shaft 434 and its other end extending through one end of the respective tubes 420 and connected with the magnet 422 therein; a second set of elongated flexible connectors 440, each of which has one end connected with shaft 438 and its other end extending through the opposite end of the respective tube 420 from the corresponding connector 436 and connected with the magnet 422 therein such that simultaneous rotation of shafts 434 and 438 in one direction causes the first set of flexible connectors 436 to wind around shaft 434 and the other set of flexible connectors 440 to unwind from shaft 438 to cause movement of the magnets 422 toward the right in FIG. 1. Simultaneous rotation of shafts 434 and 438 in the opposite direction causes the first set of flexible connectors 436 to unwind from shaft 434 and the other set of flexible connectors 440 to wind around shaft 438 to return the magnet 422 to the position shown in FIG. 1.

The shafts 438 and 434 are housed respectively in the manifolds 426 and 248, and shaft 434 is connected with a variable speed DC motor. Shaft 438 is biased by springs 442 against rotation in a direction to permit the magnets 422 to move toward the right in FIG. 1.

Motor 432 can be connected with the shaft 434 through a gear reduction and automatic clutch device that provides for a dwell cycle of the magnet 422 at manifold 428, after which the shaft will be disengaged from motor 432 to permit the recoil spring 432 to return the magnets 422 to the starting position adjacent the manifold 426. The automatic clutch and gear reduction are illustrated schematically at 433 in FIG. 1.

As the magnets 422 move from the starting position adjacent manifold 426 to the dwell position adjacent manifold 428, material carried with the magnets by the magnetic attraction thereof strikes the barrier 430 and is released from the field of the magnet 422 as the magnets 422 move past the barrier 430.

The magnets 422 in the embodiment of FIGS. 1 and 2 comprise a cylindrical body 444 with antifriction means carried by the body for supporting the body in the tube 420 is a substantially frictionless manner. The antifriction means is in the form of rollers 446 and 448 mounted on each end of the cylindrical body 444. The inner surface of the tubular member 420 is of circular cross-section, and each of the rollers 446 and 448 has an outer, semi-spherical surface engaging the inner surface of the tubes 420, the semi-spherical surface of the rollers being substantially concentric with the inner surface of the tube 420. The rolling axis of roller 446 is angularly disposed about the longitudinal axis of the tube 420 ninety degrees from the rolling axis of the roller 448.

Figure 3:
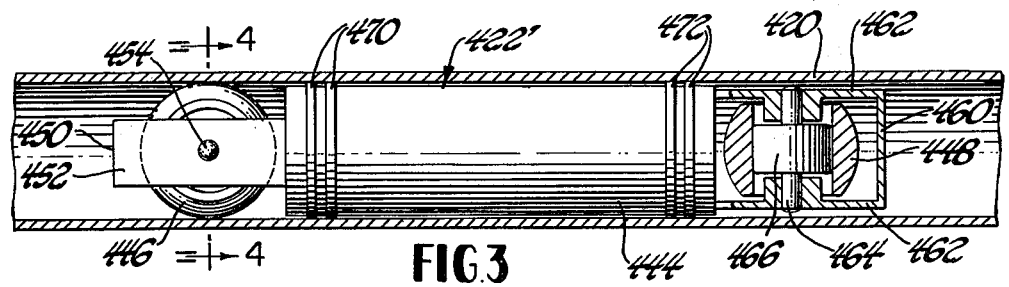
FIG. 3 is an enlarged sectional detailed view of a modification of the embodiment shown in FIGS. 1 and 2.
Figure 4:
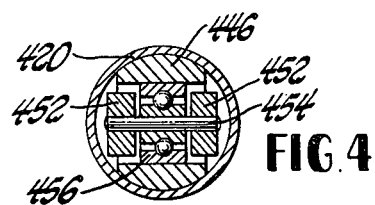
FIG. 4 is a sectional view taken along lines 4—4 of FIG. 3.

FIGS. 3 and 4 illustrate the construction of a magnet 422' which is similar to the construction of the magnets 422 shown in FIGS. 1 and 2 except that the magnet 422' is provided with seals for use in a fluid system. The magnet 422' is received in a tube 420 and has a cylindrical body 444 with a roller 446 mounted at one end and a roller 448 mounted at the other end. The roller 446 is mounted on a U-shaped bracket having a base portion 450 and a pair of leg portions 452. The roller 446 has a semi-spherical outer surface which is concentric with the tube 420, as shown particularly in FIG. 4. The roller 446 rotates about a shaft 454 which extends through a bearing assembly 456 concentrically received in the roller 446. Roller 446 similarly is mounted on a U-shaped bracket having a base portion 460, leg portions 462, shaft 464 and bearing assembly 466. The construction of the roller 448 and its supporting structure is identical with that of roller 446 except that the shaft 464 is disposed at right angles to the shaft 454. Sealing members 472 are mounted in the circumferential grooves at opposite ends of the cylindrical body portion 444.

The magnetic element can be either a permanent magnet or an electromagnet. In the embodiment of FIG. 1, for example, the connectors 436 may be in the form of insulated wire to carry current from a source of direct current to an electromagnet 422. Conductors may also be applied to the inner surface of the tubes 420 for sliding electrical engagement with electromagnetic elements movably mounted in the tubes. The magnetic element can be completely sealed from the surrounding environment permitting the apparatus to be inserted into liquids, powders, and preventing contamination from the ambient atmosphere.

Thus, the invention is embodied in FIG. 1 in apparatus including an elongated tubular member 420 of nonmagnetic material; a magnet 422 slidably received in the tubular member 420 for movement along the length thereof between a starting position and a dwell position on opposite sides of the barrier means 430; and mechanical motion transmitting means 436, 440 connected with the magnet 420 and with power means 434 and 438, respectively, selectively operable to cause the magnet to move in opposite directions between the starting and dwell positions. The motion transmitting means extends from the respective power means 434 and 438 through the tubular member 420 into connection with the magnet 422 whereby the magnet and motion transmitting means are prevented by the tubular member from contacting material attracted by the magnet 422 externally of the tubular member.

Figure 5:
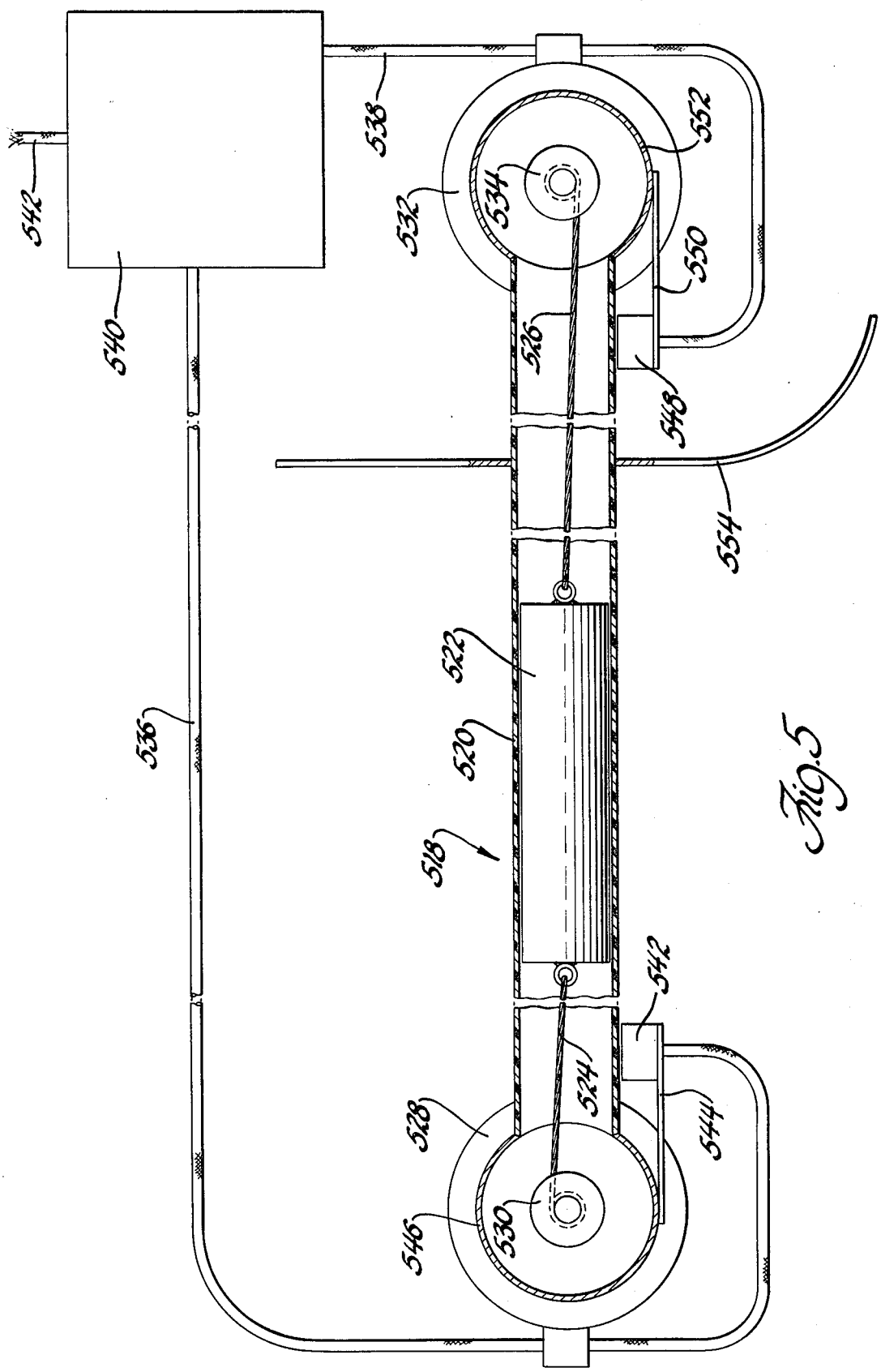
FIG. 5 is a sectional view of apparatus embodying the invention in another form.

FIG. 5 illustrates another embodiment of the invention wherein reference numeral 518 collectively designates apparatus for handling material by magnetic attraction comprising a tubular member 520 of nonmagnetic material; a magnet 522 supported in the tubular member 520 for reciprocal movement along the length thereof; mechanical motion transmitting means in the form of cables or other elongated flexible members 524, 526 for moving the magnet in opposite directions along the length of the tubular member 520, and power means for driving the motion transmitting means. The power means includes drum 530 connected with the flexible member 524 and drivingly connected with a motor 528, and a drum 534 connected with the flexible member 526 and drivingly connected with motor 532.

Motors 528 and 532 are electric motors, and are interconnected through electrical conduits 536 and 538 with a control panel 540. An electrical conduit 542 from a source of power is connected with the control panel 540.

A monmagnetic housing 546 encloses the drum 530, and a bracket 544 secured to the housing 546 supports a magnetically responsive reed switch 542 near the left end of the tube 520, as shown in FIG. 5. Similarly, a nonmagnetic housing 552 encloses the drum 534, and a bracket 550 is secured to the drum 552 and supports a magnetically responsive reed switch 548 near the righthand end of the tube 520, as shown in FIG. 5. The switches 542 and 548 are electrically connected with conduits 536 and 538 respectively, and are hence in the circuitry of the control panel 540.

When the motor 528 is energized, and motor 532 is deenergized, motor 528 causes drum 530 to rotate in a counterclockwise direction, as viewed in FIG. 5, to cause the magnet 522 to move toward the starting position at the left end of the tube 520. Conversely, when motor 532 is energized and motor 528 is deenergized, drum 534 rotates in a clockwise direction to wind the elongated flexible member, or cable, 526 around drum 534 and cause the cable 524 to correspondingly unwind from drum 530 to thereby move the magnet 522 from the starting position at the lefthand end of the tube 520 to the dwell position at the righthand end of tube 520.

Energization and deenergization of the motors 528 and 532 is accomplished automatically through the reed switches 542 and 548 when the magnet 522 moves to the respective ends of the tube. When the magnet moves to the starting position at the left end of the tube, the field of the magnet causes actuation of the reed switch 542, which in turn causes the control panel 540 to supply power to energize the motor 532 and simultaneously interrupt the power to motor 528. When the magnet 522 reaches the dwell position at the right-hand end of tube 520, the field of the magnet actuates the magnetic reed switch 548 to cause power to be supplied to motor 528 and to simultaneously interrupt the power to motor 532. Thus, when the magnet 522 moves to the starting position at the lefthand end of the tube 520, the reed switch 542 is actuated to cause energization of motor 532 and deenergization of motor 528. Conversely, when the magnet 522 moves the dwell position at the righthand end of the tube 520, the reed switch 548 is actuated to cause energization of motor 528 and deenergization of motor 532.

The reed switches 542 and 548 thus constitute control means responsive to the position of magnet 522 for controlling the power means, the control means 542, 548 being operable by the magnet to cause the magnet to move toward the dwell position when the magnet is in the starting position and toward the starting position when the magnet is in the dwell position.

As in the previously described embodiment, a barrier 554 is provided to interrupt movement of articles and materials attracted by the magnet 522 as the magnet travels toward the dwell position to cause such articles and materials to separate from the magnet as the magnet continues to move to dwell position. The barrier 554 is in the form of a shield engaged with the tube 520 so as to prevent movement of any material past the barrier in the direction of the dwell position. Thus, as in the previously described embodiment, as the magnet 522 moves from the starting position adjacent motor 528 to the dwell position adjacent motor 532, material carried with the magnet by the magnetic attraction thereof strikes the barrier 554 and is released from the field of the magnet 552 as the magnet moves past the barrier to the dwell position.

While only one tubular member 520 the magnet 522 is shown in FIG. 5, it is obvious that a plurality of the tubes and the magnets can be disposed in spaced, parallel relationship as in the embodiment of FIG 1.

As in the embodiment of FIG. 1, the magnet 522 may be an electromagnet, and the flexible connectors 524 and 526 may be electrical cables for supplying current to the electromagnet.

Thus, the invention is embodied in FIG. 5 in apparatus including an elongated tubular member 520 of non-magnetic material; a magnet 522 slidably received in the tubular member 520 for movement along the length thereof between a starting position and a dwell position on opposite sides of the barrier means 554; and mechanical motion transmitting means 524, 526 connected with the magnet 520 and with power means 530 and 534, respectively, selectively operable to cause the magnet to move in opposite directions between the starting and dwell positions. The motion transmitting means extends from the respective power means 530 and 534 through the tubular member 520 into connection with the magnet 522 whereby the magnet and motion transmitting means are prevented by the tubular member from contacting material attracted by the magnet 522 externally of the tubular member.

With reference to FIG. 6, another embodiment is collectively designated by reference numeral 618. Apparatus 618 comprises a tubular member 620 of non-magnetic material; a magnet 622 supported in the tubular member 620 for reciprocal movement along the length thereof; mechanical motion transmitting means in the form of an elongated feed screw 624 extending through the magnet 622 in threaded engagement therewith for moving the magnet in opposite directions along the length of the tube 620, and power means for driving the feed screw 624. The power means includes the output shaft of a reversible motor 632 coupled non-rotatably at 625 with the feed screw 624.

The feed screw 624 in FIG. 6 extends coaxially through the magnet 622 in threaded engagement with an internally threaded passage 623 formed in the magnet 622. The end of the feed screw 624 opposite motor 632 is supported in a bearing assembly 628 positioned at the closed end of the tube 620. When the feed screw 624 rotates in one direction, the magnet 622 moves toward the left, as viewed in FIG. 6, from the starting position adjacent motor 632 to the dwell position adjacent the bearing assembly 628. Conversely, when the feed screw rotates in the opposite direction, the magnet 622 is driven thereby toward the dwell position at the lefthand end of the tube adjacent bearing 628. Guide strips 628 are attached to opposite sides of the tube 620 by screws 630 as shown in FIGS. 6 and 7, and grooves 626 are formed in the sides of the magnet 622 diametrically opposite each other and extend along the length thereof for receiving the guide strips 628 to prevent rotation of the magnet 622 in response to rotation of the feed screw 624.

A barrier 640 in the form of a shield which may be identical to the shield 554 of the previously described embodiment is provided in the apparatus of FIG. 6 to interrupt the movement of material carried by the magnet 622 as the magnet 622 moves toward the dwell position at the left end of the tube 620.

Motor 632 is a reversible motor, and the direction of the motor is determined by magnetically responsive reed switches 634 and 636. When the magnet 622 is located at the righthand end of the tube 620, the field of the magnet actuates the reed switch 634 to cause the motor 632 to rotate in a direction to move the magnet 622 toward the left as viewed in FIG. 6. Conversely, when the magnet 622 reaches the dwell position at the lefthand end of the tube 620, the field of the magnet operates the magnetically responsive reed switch 636 to reverse the motor 632 and cause the motor 632 to drive the magnet to the righthand end of the tube 620.

The reed switches 634 and 636 thus constitute control means reponsive to the position of magnet 622 for controlling the power means, the control means 634, 636 being operable by the magnet to cause the magnet to move toward the dwell position when the magnet is in the starting position and toward the starting position when the magnet is in the dwell position.

FIG. 8 illustrates an embodiment using a plurality of assemblies of the type shown in FIG. 6. In FIG. 8, a plurality of assemblies 618a, b, c, d and e, each similar to the apparatus 618 of FIG. 6, are disposed in spaced parallel relationship. The assembly 618a includes a tube 620a, a magnet 622a and feed screw 624a corresponding respectively to the tube 620, magnet 622 and feed screw 624 of FIG. 6. The assemblies 618b, c, d and e are identical to the assembly 618a.

Input gears 656a–e are mounted respectively on the input ends of the feed screws 624a–e. The gears 656a–e are each linked with a drive screw 650, the drive screw 650 being non-rotatably coupled at 651 to the output shaft of a reversible electric motor 652. Rotation of the drive screw 650 in one direction causes the magnets 622a–e to simultaneously move from the starting position adjacent the drive screw 650 to a dwell position at the ends of the respective tubes 650a–e opposite the drive screw 650. Conversely, rotation of the drive screw 650 in the opposite direction causes the magnets 622a–e to simultaneously return from the dwell position to the starting position shown in FIG. 8.

The reversible motor 652 may be controlled by reed switches in the same manner as the motor 632 in FIG. 6 so that the motor reverses each time the magnets 622a–e reach the starting or dwell positions.

In the FIG. 8 embodiment, reference numeral 660 indicates a barrier engaged with the tubes 620a–e between the starting and dwell positions. As in the embodiment of FIG.1, material carried with the magnets 620a–e by the magnetic attraction thereof strikes the barrier 660 and is released from the field of the magnets as the magnets move past the barrier 660 to the dwell position at the ends of the tubes 620 opposite the drive screw 650.

Thus, the invention is embodied in FIGS. 6–8 in apparatus including an elongated tubular member 620 of nonmagnetic material; a magnet 622 slidably received in the tubular member 620 for movement along the length thereof between a starting position and a dwell position on opposite sides of the barrier means 660; and mechanical motion transmitting means 624 connected with the magnet, and with power means 625, 632 selectively operable to cause the magnet 622 to move in opposite directions between the starting and dwell positions. The motion transmitting means 624 extends from the power means 625, 632 through the tubular member 620 into connection with the magnet 622 whereby the magnet and motion transmitting means are prevented by the tubular member 620 from contacting material attracted by the magnet 622 externally of the tubular member.

FIGS. 9 and 10 illustrate another embodiment of the invention wherein reference numeral 718 collectively designates apparatus for handling material by magnetic attraction comprising a tubular member 720 of nonmagnetic material, a magnet 722 supported in the tubular member for reciprocable movement along the length thereof; mechanical motion transmitting means in the form of a cable 724 or other elongated flexible means for moving the magnet along the length of the tubular member 720; and power means for driving the motion transmitting means. The power means includes a shaft 726 drivingly connected with a motor 730.

In the embodiment of FIGS. 9 and 10 the apparatus 718 includes a pair of spaced, parallel tubular members 720 on noncircular cross-section secured together by a web 723 to form a trough 725 between the tubular members 720. A magnet 722 is slidably received in each of the tubular members 720. The assembly 718 has an upper end indicated at 727 and a lower end indicated at 729.

Each magnet is connected by a cable of elongated flexible member 724 with pulleys 728 mounted on shaft 726, shaft 726 extending transversely across the open ends of the tubes 720 at the upper end 727 of the assembly. In the illustrated embodiment, shaft 726 is connected with the output shaft of motor 730 by means of a clutch 731 (FIG. 10) operable, when engaged to couple shaft 726 to the motor, and operable, when disengaged, to permit shaft 726 to rotate freely with respect to the motor shaft. With the clutch engaged, when shaft 726 is caused to rotate in a clockwise direction as viewed in FIG. 9 by the motor 730, the flexible cables 724 wind around the pulleys 728 to cause the magnet 722 to move from a starting position at the lower end of the assembly, the position of magnets shown in the drawings, to a dwell position at the upper end of the assembly 718. When the magnets 722 are located at the dwell position at the upper end 727, deenergization of the motor 730 and disengagement of the clutch permits the magnets to return by gravity to the starting position at the lower end 729 of the assembly.

In order to reduce the resistance to movement of the magnets 722 in the tubular member 720, anti-friction means may be provided between the magnets and inner walls of the tubular members. In the illustrated embodiment, the anti-friction means is in the form of rollers 734, 736 and 738 mounted on the magents 722 for respectively engaging the upper surfaces, side surfaces and bottom surfaces of the tubular members. Obviously, the anti-friction means can take forms other than that of the illustrated rollers 734, 736 and 738.

A barrier 742 is mounted between the tubes 720 near the upper end 727, and the web 723 terminates at 740 at a position spaced from the barrier 742. Consequently as the magnets 722 move past the barrier 742 to the dwell position, material carried in the trough 725 by the magnets strikes the barrier 742 and is released from the magnetic field of the magnets as the magnets move past the barrier 742 to the dwell position.

Reed switches 744 and 746 are schematically shown in FIG. 9 near the upper and lower ends, respectively, of the assembly, or adjacent the dwell and starting positions of the assembly. The reed switches control the motor 730 and clutch 731. When the magnets are located at the starting position at the lower end 729 of the apparatus, the magnetic field of the magnets actuates reed switch 746 to cause clutch 731 to engage and motor 730 to rotate shaft 726 in a clockwise direction (as viewed in FIG. 9), to wind cables 724 around pulleys 728 and cause the magnets to move to the dwell position. As the magnets simultaneously move to the dwell position, any ferrous or other magnetically attractive material in trough 725 is carried by the magnets to the barrier 742. As the magnets move past the barrier 742, the material strikes the barrier and falls through the space defined between the end 740 of web 723 and the barrier. When the magnets reach the dwell position at the upper end 727, the field of the magnets actuates the reed switch 744 to disengage clutch 731 and deenergize motor 730, whereupon the magnets return by gravity to the starting position at the lower end 729, the cables 724 unwinding from the pulleys 728 during the movement of the magnets to the starting position.

The reed switches 744, 746 thus constitute control means responsive to the position of the magnets 722 for controlling the power means, the control means 744, 746 being operable by the magnets to cause the magnets to move toward the dwell position when the magnets are in the starting position and toward the starting position when the magnets are in the dwell position.

As shown in FIG. 10a, the magnets 722 preferably are oriented with respect to each other in the tubular members 720 such that the north and south poles of the magnet 722 on the lefthand side of trough 725 (as viewed in FIG. 10) are respectively opposite the north and south poles of the magnet 722 on the righthand side of trough 725.

In the operation of the apparatus of FIGS. 9 and 10, the lower end 729 is disposed in a position to receive magnetically attractive material to be transported to the barrier 742. With the magnets in the starting position at the lower end 729 as illustrated in FIG. 9, and with the motor 730 connected to the main power supply, the magnetic field of magnets 722 actuates the reed switch 746 to cause the clutch 731 to engage and motor 730 to rotate shaft 726 in the direction to wind cables 724 around pulleys 728 and move magnets 722 toward the dwell position. As the magnets move from the starting position, magnetically attractive material in the trough 725 is carried by the magnets along the trough to the barrier 742. As the magnets move past the barrier, the material falls through the opening defined between the edge 740 of web 723 and the barrier into a bin or collection area.

When the magnets reach the dwell position at the upper end 727, the magnetic field actuates reed switch 744 to stop the motor 730 and disengage clutch 731, whereupon the magnets return by gravity to the starting position at the lower end 729 of the apparatus to repeat the cycle.

While specific embodiments of the invention have been disclosed in the accompanying drawings and described in the foregoing specification, it should be understood that the invention is not limited to the exact construction shown. Alterations in the construction and arrangement of parts, all falling within the scope and spirit of the invention, will be apparent to those skilled in the art.

The embodiments of the invention in which an exclusive property or privilege is claimed are defined as follows:

1. Apparatus for handling material by magnetic attraction comprising: an elongated tubular member of non-magnetic material; a magnet slidably received in said tubular member for movement along the length thereof between a starting position and a dwell position, said magnet being operable to attract articles of magnetically responsive material externally of said tubular member; and mechanical motion transmitting means connected with said magnet, said motion transitting means being selectively operable to cause said magnet to move in opposite directions between said starting and dwell positions; power means connected with said motion transmitting means for driving said motion transmitting means, said motion transmitting means extending from said power means through said tubular member into connection with said magnet whereby said magnet and motion transmitting means are prevented by said tubular member from contacting material attracted by said magnet externally of said tubular member; and barrier means operable to interrupt movement of articles and materials attracted by said magnet as the magnet travels toward the dwell position to cause such articles and materials to separate from the magnet as the magnet continues to move to the dwell position.

2. Apparatus as claimed in claim 1 further including control means responsive to the position of said magnet for controlling said power means, said control means being operable by said magnet to actuate said power means to cause said magnet to move toward the dwell position when said magnet is in the starting position and toward the starting position when said magnet is in the dwell position.

3. Apparatus as claimed in claim 2 wherein said control means comprises a pair of magnetically responsive reed switches, one of which is positioned in the field of the magnet when the magnet is in the starting position, and the other of which is positioned in the field of the magnet when the magnet is in the dwell position.

4. Appartus as claimed in claim 1 wherein said barrier means comprises a shield of non-magnetic material engaging said tubular member and located between said starting and dwell positions in the path of movement of articles and material attracted by said magnet for engaging and preventing such articles and materials from moving past the shield as the magnet moves to the dwell position.

5. Apparatus as claimed in claim 4 wherein said power means comprises a pair of rotatable shafts extending transversely of said tubular member and located at opposite ends thereof, and said motion transmitting means comprises a pair of elongated flexible members, one of which is secured between one of said shafts and said magnet and the other of which is secured between the other of said shafts and said magnet.

6. Apparatus as claimed in claim 5 wherein said power means further includes a motor for driving one of said shafts to move said magnet toward said dwell position.

7. Apparatus as claimed in claim 6 wherein said power means further includes spring means on the other of said shafts biasing said magnet to return to the starting position from said dwell position.

8. Apparatus as claimed in claim 1 wherein said magnet comprises a cylindrical body and anti-friction means carried by said body for supporting said body in said tube.

9. Apparatus as claimed in claim 8 wherein said anti-friction means comprises a roller mounted on each end of said body.

10. Apparatus as claimed in claim 9 wherein the inner surface of said tubular member is of circular cross-section and each of said rollers has an outer semi-spherical surface engaging said inner surface, said semi-spherical surface being substantially concentric with said inner surface.

11. Apparatus as claimed in claim 10 wherein the rolling axis of one of said rollers is angularly disposed about the longitudinal axis of said tubular member ninety degrees from the rolling axis of the other of said rollers.

12. Apparatus as claimed in claim 4 wherein said power means comprises at least one rotatable shaft extending transversely of said tubular member, and said motion transmitting means comprises an elongated flexible member having one end secured to said magnet and its other end secured to said shaft such that rotation of said shaft in one direction causes said flexible member to wind around said shaft and move said magnet in one direction along said tubular member, and rotation of said shaft in the opposite direction permits said magnet to move in the opposite direction along said tubular member and said flexible member to simultaneously unwind from said shaft.

13. Apparatus as claimed in claim 12 wherein said tubular member has an upper and lower end, said flexible member extending from said shaft through said upper end to said magnet such that rotation of said shaft in said one direction causes said magnet to move to said upper end, and rotation of said shaft in said opposite direction permits said magnet to move by gravity to said lower end.

14. Apparatus as claimed in claim 13 further including anti-friction means on said magnet engaging the inner surface of said tubular member.

15. Apparatus as claimed in claim 14 wherein said tubular member and said magnet are of non-circular cross-section, and wherein said anti-friction means comprises rollers mounted on said magnet for engagement with the inner surface of each wall of said tubular member.

16. Apparatus as claimed in claim 15 wherein said power means further comprises a motor for driving said shaft, and further including a clutch between said shaft and motor operable to selectively connect and disconnect said shaft from said motor such that said magnet can move in said one direction toward the upper end of said tubular member when said shaft is connected with said motor, and such that said magnet can move in said opposite direction toward the lower end of said tubular member when said shaft is disconnected from said motor.

17. Apparatus as claimed in claim 4 wherein said motion transmitting means comprises an elongated feed screw extending through said magnet in threaded engagement therewith such that rotation of said feed screw in opposite directions causes movement of said magnet in opposite directions along the length of said tubular member.

18. Apparatus as claimed in claim 17 wherein said tubular member is of circular cross-section, and further including at least one guide strip projecting from the inner surface of said tubular member and extending along the length thereof, said magnet being formed with a groove extending the full length thereof, said groove slidably receiving said guide strip to prevent rotation of said magnet in response to rotation of said feed screw.

19. Apparatus for handling material by magnetic attraction comprising: a plurality of spaced, parallel tubes of nonmagnetic material; a magnet supported in each of said tubes for reciprocable movement along the length thereof between starting and dwell positions; mechanical motion transmitting means connected with each magnet; said motion transmitting means being selectively operable to move said magnet in opposite directions between said starting and dwell positions; power means connected with the motion transmitting means for each magnet for simultaneously driving said motion transmitting means; said motion transmitting means each extending from said power means through a respective one of the tubes into connection with the magnet therein whereby said magnets and motion transmitting means are prevented by the respective tubes from contacting material attracted by said magnets externally of said tubes; and barrier means operable to interrupt movement of articles and materials attracted by said magnets as the magnets travel toward the dwell position to cause such articles and materials to separate from the magnet as the magnet continues to move to the dwell position.

* * * * *